US010613645B2

(12) United States Patent
Weins et al.

(10) Patent No.: US 10,613,645 B2
(45) Date of Patent: Apr. 7, 2020

(54) MECHANISM FOR PEN INTEROPERABILITY WITH PRESSURE SENSOR DESIGN

(71) Applicant: Microsoft Technology Licensing, LLC, Redmond, WA (US)

(72) Inventors: Connor Lawrence Weins, Seattle, WA (US); David Abzarian, Kenmore, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/965,403

(22) Filed: Apr. 27, 2018

(65) Prior Publication Data

US 2019/0332196 A1 Oct. 31, 2019

(51) Int. Cl.
*G06F 3/0354* (2013.01)
*G06F 3/041* (2006.01)

(52) U.S. Cl.
CPC ........ *G06F 3/03545* (2013.01); *G06F 3/0412* (2013.01); *G06F 3/0414* (2013.01); *G06F 3/0416* (2013.01)

(58) Field of Classification Search
CPC .. G06F 3/03545; G06F 3/0412; G06F 3/0414; G06F 3/0416
USPC ........................................................ 345/179
See application file for complete search history.

(56) References Cited

U.S. PATENT DOCUMENTS

| | | |
|---|---|---|
| 2007/0025805 A1 | 2/2007 | Lapstun et al. |
| 2009/0314552 A1 | 12/2009 | Underwood et al. |
| 2014/0168156 A1* | 6/2014 | Bytheway ............... G06F 3/044 345/174 |
| 2015/0277595 A1* | 10/2015 | King-Smith ........ G06F 3/03545 345/177 |
| 2015/0324018 A1 | 11/2015 | Hinson |
| 2016/0195942 A1 | 7/2016 | Chen et al. |
| 2016/0266663 A1* | 9/2016 | Holsen .................... G06F 3/044 |
| 2016/0306448 A1* | 10/2016 | Fleck .................. G06F 3/03545 |
| 2016/0342227 A1 | 11/2016 | Natzke et al. |
| 2017/0131817 A1 | 5/2017 | Wong et al. |

OTHER PUBLICATIONS

"International Search Report & Written Opinion Issued in PCT Patent Application No. PCT/US19/026415", dated May 27, 2019, 11 Pages.

\* cited by examiner

*Primary Examiner* — Mark Edwards
(74) *Attorney, Agent, or Firm* — Workman Nydegger (57) ABSTRACT

Features of the present disclosure solve the above-identified problem by implementing techniques to detect the contact or proximity of a stylus to a display screen of a computer device in the absence of pressure information within the constraints of existing pen protocols. To this end, a digitizer associated with the display screen of the computer device may determine when the stylus is touching (or significantly close) the screen when a signal communication between the pen and digitizer exceeds a threshold (e.g., time or voltage).

20 Claims, 5 Drawing Sheets

MECHANISM FOR PEN INTEROPERABILITY WITH PRESSURE SENSOR DESIGN

FIELD OF THE INVENTION

The invention generally relates to methods for detecting user input by pen-like stylus on the display screen in the absence of pressure sensor information.

BACKGROUND

Typical computer devices (e.g., personal computers, mobile phones, tablets, etc.) include graphical user interface (GUI) systems that are optimized for accepting user input from one or more discrete input devices for entering text (such as a keyboard), and a pointing device (such as a mouse) with one or more buttons for activating user selections. Some computing systems have expanded the input systems available to a user by providing a pen-like stylus. For purposes of this disclosure, the term "pen-like stylus," "stylus" and "pen" may be used interchangeably to describe an active pen (also referred to as active stylus) that may be an input device that includes electronic components and allows users to write directly or interact with the display screen surface of a computer device (e.g., laptops, tablets, mobile devices, etc.).

Using a pressure sensitive overlay or an electronic digitizer, a computer display may be enhanced to accept interaction from a user by using the stylus. The stylus or pen communicate pressure information (e.g., how hard the user has pressed on the screen) to the host through reserved communications windows in the pen/stylus protocol. The pressure information can be useful in applications, for example, painting where the pressure may correspond to the thickness of the line. While the information from the pressure sensor of the stylus can be valuable for the computer device, the pressure sensors are also susceptible to be damaged or breakage because the pressure sensors are generally associated with the stylus tip which itself presents a physical weakness on the stylus as a whole.

However, if the pressure sensor or the stylus tip associated with the pressure sensor is damaged or broken, a user typically is left with no other alternative but to discard the damaged stylus and purchase a new one. This is because in current pen protocols, there is no mechanism for the stylus to report that the stylus is in contact with the computer device without available pressure information. As such, the damaged stylus may be rendered useless because pressure is generally used as an indication of contact with a display or screen.

While one solution may be to possibly revise existing pen protocols to account for the reporting of the pressure-less pen (i.e., damaged pressure sensor), such a solution is not always feasible, especially when a large number of protocol timing windows are already taken by existing data. Revising the existing protocol also does not help existing in-market pen devices which have experienced a broken pressure sensor.

SUMMARY

Features of the present disclosure solve the above-identified problem by implementing techniques to detect the contact or proximity of the stylus to the display screen in the absence of pressure information within the constraints of existing pen protocols. To this end, a digitizer associated with the display screen of the computer device may determine when the stylus is touching (or significantly close) the screen when a signal communication between the pen and digitizer exceed a threshold (e.g., time or voltage).

In one example, a method for detecting input associated with an input instrument is described. The method may include receiving, at a digitizer of a computer device, a signal from the input instrument, the signal lacking pressure information. The method may further include detecting whether the signal from the input instrument exceeds a voltage threshold. The method may further include determining that the input instrument is a pressure-less input instrument based at least on detecting that the signal exceeds the voltage threshold. The method may also include configuring the input with default pressure information based at least on determining that the input instrument is the pressure-less input instrument.

In another example, a computer device for detecting input associated with an input instrument is disclosed. The computer device may include a memory to store data and instructions, a processor in communication with the memory. The processor may be configured to execute instructions to receive, at a digitizer of a computer device, a signal from the input instrument, the signal lacking pressure information. The instructions may further be executable by the processor to detect whether the signal from the input instrument exceeds a voltage threshold. The instructions may further be executable by the processor to determine that the input instrument is a pressure-less input instrument based at least on detecting that the signal exceeds the voltage threshold. The instructions may further be executable to configure the input with default pressure information based at least on determining that the input instrument is the pressure-less input instrument.

In another example, computer-readable medium storing instructions executable by a computer device for detecting input associated with an input instrument is described. The computer-readable medium may include instructions executable by the computer device for receiving, at a digitizer of a computer device, a signal from the input instrument, the signal lacking pressure information. The instructions may further be executable for detecting whether the signal from the input instrument exceeds a voltage threshold. The instructions may further be executable for determining that the input instrument is a pressure-less input instrument based at least on detecting that the signal exceeds the voltage threshold. The instructions may further be executable for configuring the input with default pressure information based at least on determining that the input instrument is the pressure-less input instrument.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

DETAILED DESCRIPTION

As discussed above, the pressure sensors associated with the stylus tips may be vulnerable to damage or breakage from fatigue or excessive force as each reflect a physical weakness of a pen. When the pressure sensor or the stylus tip associated with the pressure sensor is damaged or broken, a user typically is left with no other alternative but to discard the damaged stylus and purchase a new one because in current pen protocols there is no mechanism for the stylus to report that the stylus is in contact with the computer device without available pressure information. The need to continuously replace damaged stylus may not be cost conscious. This is especially true for institutions (e.g., schools) that typically work with children, for example, who frequently mishandle the stylus and may damage or break the stylus. For such institutions, having to continuously replace stylus may not be feasible.

While one possible solution may be to revise existing pen protocols to account for the reporting of the pressure-less pen (i.e., damaged pressure sensor), such a solution is not always feasible, especially when a large number of protocol timing windows are already taken by existing data. Revising the existing protocol also does not help existing in-market pen devices which have experienced a broken pressure sensor.

Thus, features of the present disclosure solve the above-identified problem by implementing techniques to detect the contact or proximity of the stylus to the display screen in the absence of pressure information within the constraints of existing pen protocols. Indeed, features of the present disclosure allow a pressure-less and pressure-capable pens to be functional on the same system as needed.

Additionally, note that the term pressure, as relating to pressure sensors and the like may refer to various sensor types and configurations. For example, in various cases and embodiments, pressure may refer to pen tip pressure exerted on a display screen surface (or "display"). In general, pen tip pressure is typically sensed by some type of pressure transducer inside the pen, but it is also possible to have the pen tip pressure sensing done by the display/digitizer itself in some devices. In addition, the term pressure or pressure sensing or the like may also refer to a separate channel of sensing the grip pressure of the hand (or fingers) contacting an exterior casing or surface of the pen.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
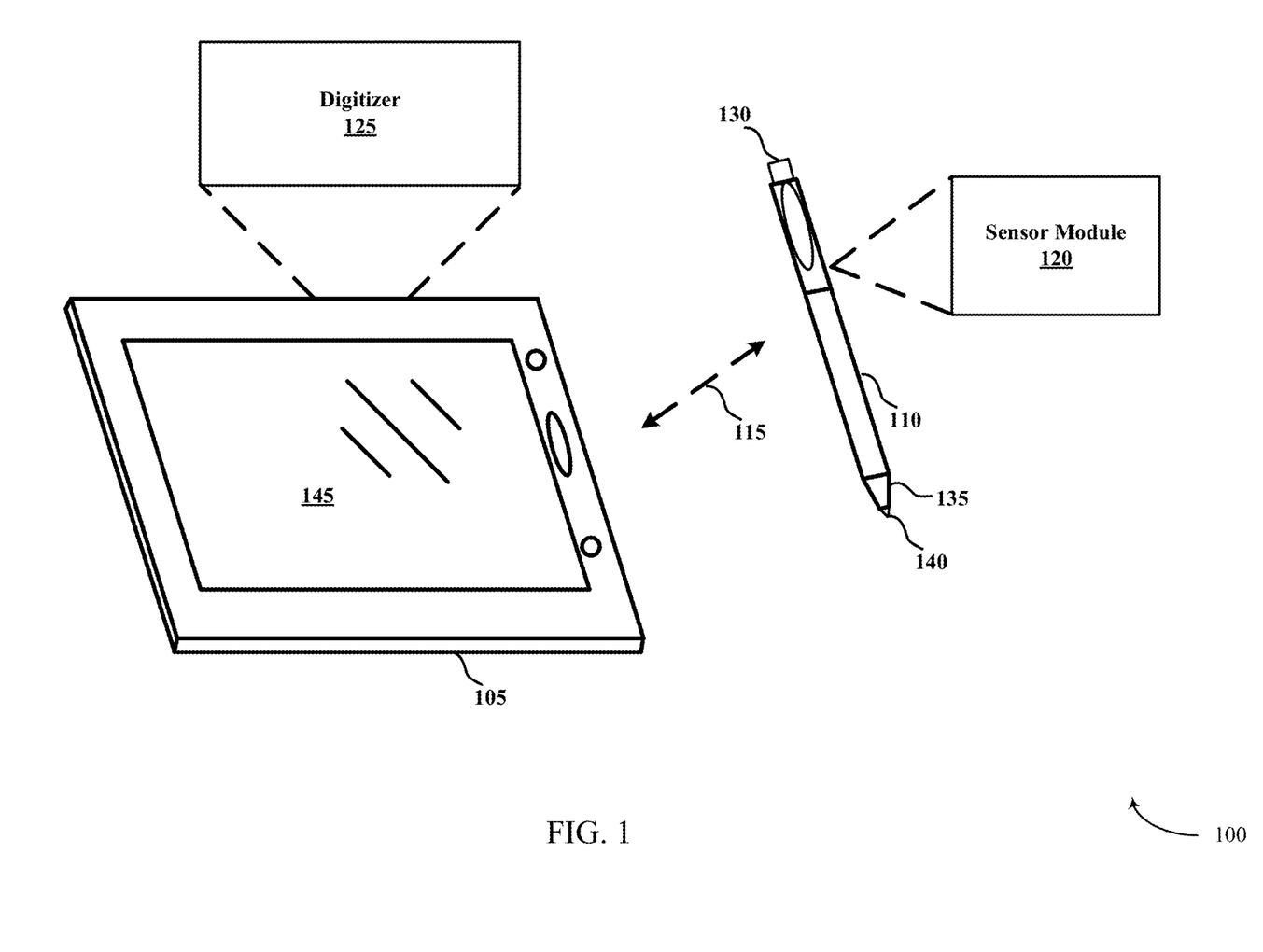
FIG. 1 is an example of a computer system that illustrates interaction between a computer device and a stylus in accordance with various aspects of the present disclosure.

Turning first to FIG. 1, a computer system 100 includes interoperation between a computer device 105 and a stylus 110 (or active pen). In some examples, stylus 110 may be in communication with touch sensitive computer device 105 via communications link 115. The stylus 110 may include a sensor module 120 embedded within the stylus 110 for monitoring readings of one or more sensors (e.g., pressure sensor or button trigger), and provides detected sensor information (e.g., pressure sensor information) to the computer device 105.

The touch sensitive computer device 105 may include a digitizer 125 that may receive data from the stylus 110, including input from one or more sensors of pen (e.g., inertial, accelerometers, pressure, grip, near-field communication, RFID, temperature, microphones, magnetometers, capacitive sensors, gyroscopes, etc.). In some examples, the computer device 105 may also receive input from user touch of one or more touch sensitive surfaces 145 of the computer device 105. Given the sensor inputs and the touch inputs, if any, the digitizer 125 may then evaluate simultaneous, concurrent, sequential, and/or interleaved sensor pen 105 inputs and touch inputs (i.e., finger, palm, hand, etc.) on displays or other touch sensitive surfaces of the computer device 105 relative to contexts of sensor pen 110 and computer device 105 to trigger or activate one or more motion gestures.

In some examples, the stylus 110 may include a power source (not shown) for generating minimum operating voltages for the stylus to ensure the signal envelopes can be detected by the digitizer 125 for hover information. Generally, when the stylus 110 is in proximity (hovering or contacting) the computer device 105, the stylus 110 may transmit a signal to the digitizer through a plurality of electrodes, including but not limited to: tail electrode 130, ring electrode 135, and/or tip electrode 140. The stylus 110 may transmit a signal with the same frame length through all its modes of operation where the content of the frames may vary between states. The transition between the various states may be based on sensing the pressure applied on the tip electrode 140 of the stylus. The stylus 110 may use a wide array of frequencies for communicating information from the stylus 110 to the computer device 105 (e.g., 15-45 KHz, 75-86 KHz, 150-210 KHz).

Figure 2A:
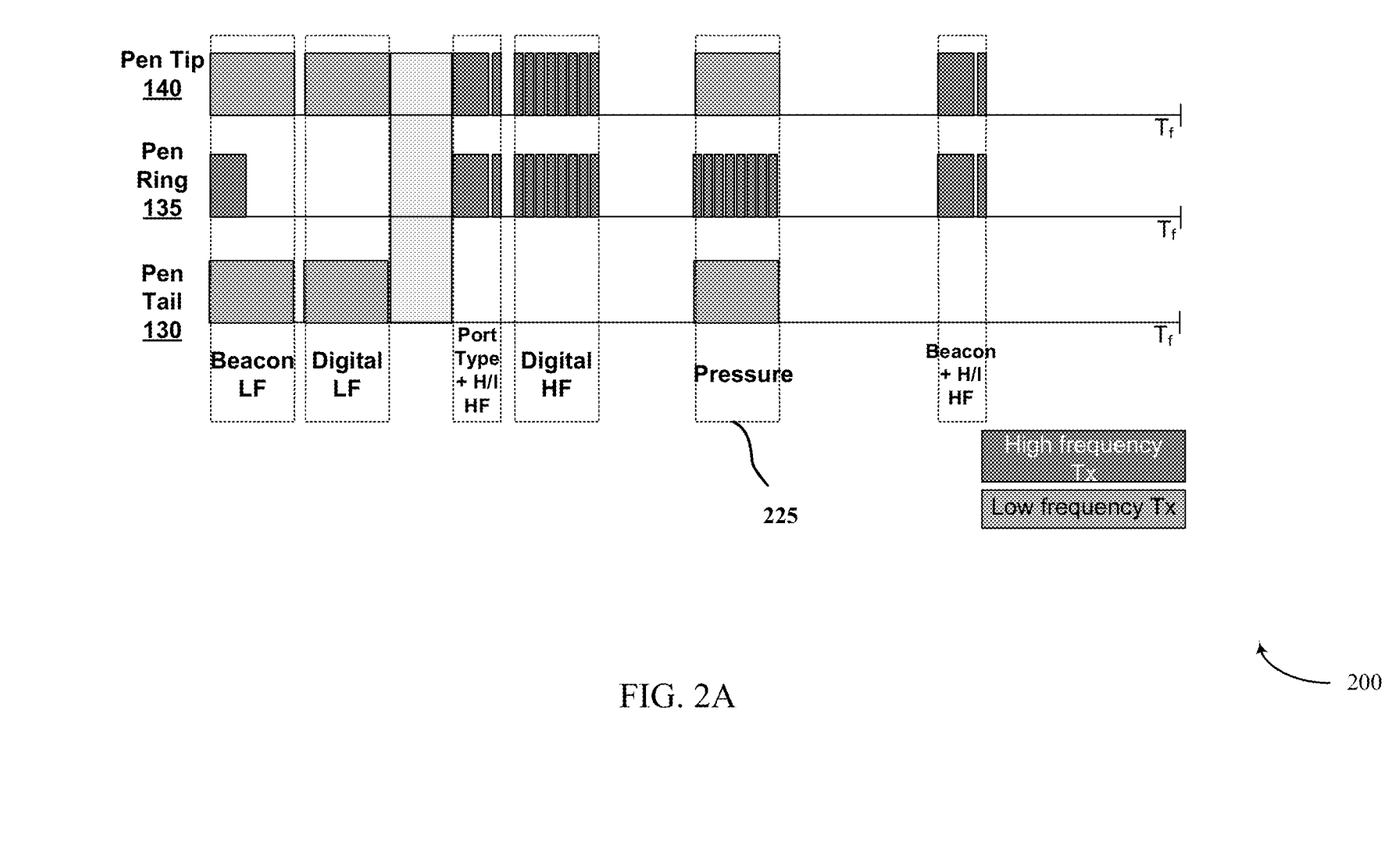
FIG. 2A is an example of the communication timing structure for signals transmitted from the stylus to the computer device that includes pressure information in accordance with various aspects of the present disclosure.
Figure 2B:
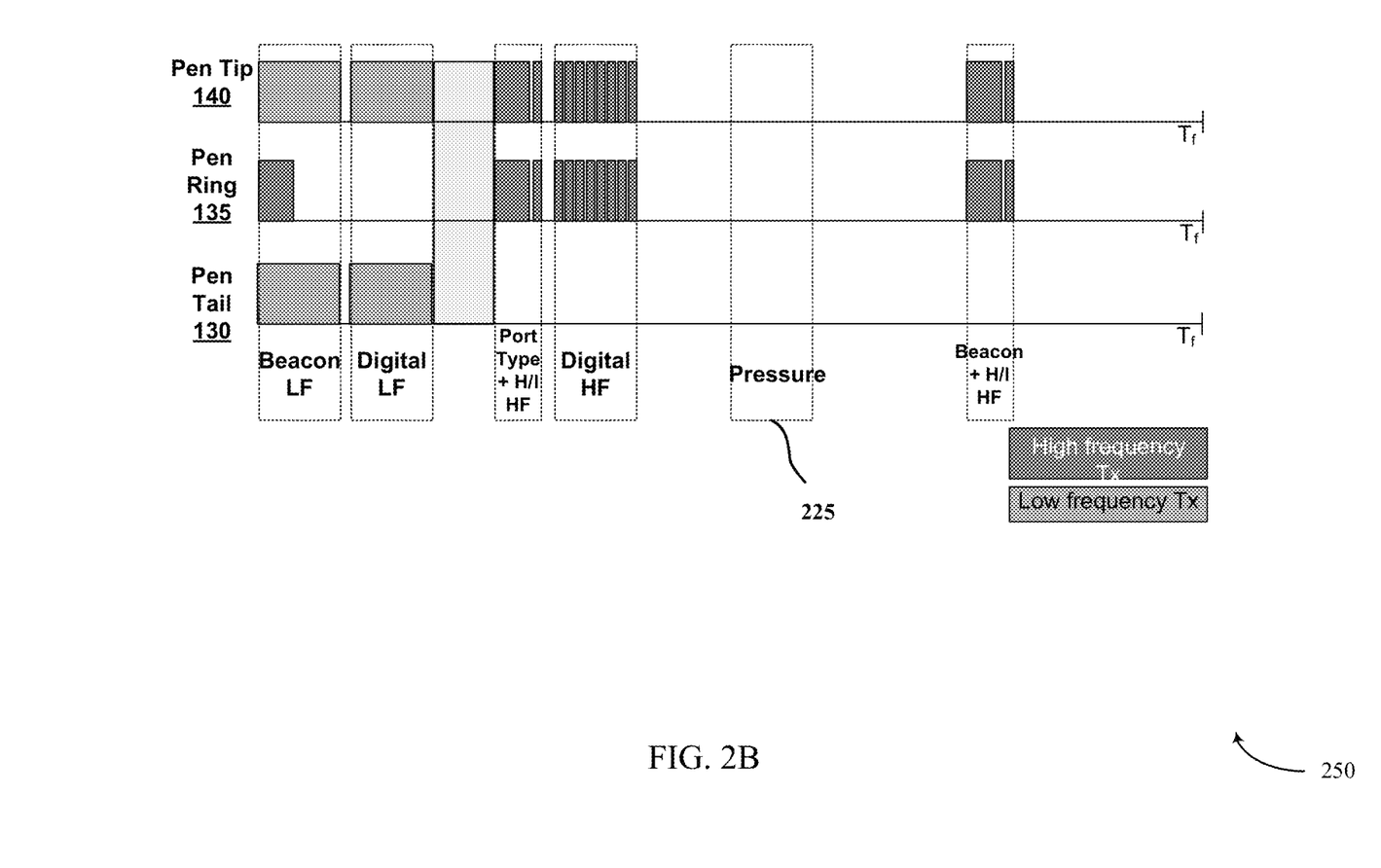
FIG. 2B is an example of the communication timing structure for signals transmitted from the stylus to the computer device in absence of pressure information in accordance with various aspects of the present disclosure.

As illustrated in FIG. 2A, the information transmitted from the stylus 110 to the computer device 105 may include, but is not limited to tip and ring position of the stylus 110, the detected pressure levels from the pen tip 140, and/or pressure (or "force") information 225. However, in the instance of damaged or broken pen tip 140 (or pen ring 135 or pen tail 130) and associated pressure sensor (not shown), the information transmitted from the stylus 110 to the computer device 105 may not include any pressure information, as illustrated in FIG. 2B. Specifically, as in FIG. 2B, the frame structure that generally include pressure information 225 may be missing one or more of pressure information acquired from the tip electrodes 140, ring electrodes 135, and/or tail electrodes 130. Generally, in the absence of the pressure information, the digitizer 125 may not sense the contact or hovering of the stylus 110 on or near the computer device 105. Features of the present disclosure, however, allow the digitizer 125 to detect the touch and/or hovering information from the stylus 110 and display the corresponding cursor or writing even in the absence of one or more pressure information 225.

Returning to FIG. 1, the digitizer 125 of the computer device 105 may sense, even in the absence of pressure information 225, various properties of the sensor pen 110 relative to various distances between the sensor pen 110 and the computer device 105 (i.e., contact, hover range (e.g., 3-8 mm), and beyond hover range), and whether the motions of the sensor pen 110 are correlated with a concurrent user touch of a display or some other touch-sensitive surface of the computer device 105 or with some motion of the computer device 105. Specifically, when the digitizer 125 detects that the pressure information 225 is missing from the signal(s) transmitted by the pen 110, the digitizer 125 may determine that the pressure sensor from one or more of tail electrode 130, ring electrode 135, and/or tip electrode 140 is damaged or broken.

Notwithstanding the absence of pressure information 225, the digitizer 125 may leverage the display 145 and stylus 110 characteristics to detect if the stylus 110 is in contact (or hovering) against the display 145 of the computer device 105. Specifically, as the stylus 110 is brought near or in contact with the display 145, the stylus 110 may transmit one or more signals to the computer device 105. When the digitizer 125 detects the presence of signal, but an absence of the pressure information 225 in the frame structure of the signal for a predetermined threshold (e.g., time or peak power of the signal), the digitizer 125 may determine that the stylus 110 is in contact with the display 145 despite lack of pressure information. As such, the digitizer 125 may display the corresponding cursor or user input using default pressure settings as a substitute of pressure information.

These sensed properties of the sensor pen 110 may then be correlated with various touches or motions of the stylus 110 at the computer device 105, and may also be considered in view of the current contexts of either or both the sensor pen 110 and computer device 105 (e.g., whether they are being held, moving, power state, application status, etc.), and used to trigger a variety of "motion gestures" or other actions.

With respect to hover range, in various embodiments, the digitizer 125 may consider distance of the sensor pen 110 above the digitizer 125 of the computer device 105 based on various ranges, including three range categories: physical contact, within hover range of the digitizer 125, or beyond range of the digitizer 125. The activation mechanism for any particular detection and motion gestures may consider these different ranges of the sensor pen 110, in combination with any other correlated inputs, touches, and/or motions of the computer device 105.

As noted above, raw sensor readings from the stylus 110 may be reported or transmitted from the stylus 110 to the computer device 105 for evaluation and characterization by the computer device 105 based on pen protocols. For example, raw sensor data from inertial sensors within the sensor pen can be reported by the pen 110 to the computer device 105, with the computer device 105 then determining pen orientation as a function of the data from the inertial sensors. Alternately, in various embodiments, the pen 110 may use onboard computational capability to evaluate the input from one or more sensors. For example, sensor data derived from inertial sensors within the pen 110 can be processed by a computational component of the sensor module 120 to determine pen orientation, with the orientation of tilt then being reported by the pen to the computer device 105.

Clearly, any desired combination of reporting of raw sensor data and reporting of processed sensor data to the computer device 105 by the pen 110 can be performed depending upon the computational capabilities of the pen 110. However, for purposes of explanation, the following discussion will generally refer to reporting of sensor data to the computer device 105 by the pen 110 for further processing by the computer device 105 to determine the proximity, contact, motion gestures or other input scenarios of the pen 110.

For example, one such input technique, referred to as a "touch and tilt for layers" gesture, uses a concurrent user touch and sensor pen tilt to activate or interact with different layers displayed on a screen 145. Note that the touch and tilt for layers gesture is initiated with the sensor pen 110 at any desired distance from the display screen 145. Sensor pen tilt is determined by one or more of the pen sensors and reported to the computer device 105 via the communications capabilities of the pen 110. The touch and tilt for layers gesture is discussed in further detail herein.

Another gesture may include a "touch and spatter" gesture that uses sensors of the pen to detect a user initiated rapping of the pen motion while the user is touching the display of the computer device 105. In general, the touch and spatter gesture operates in a drawing or painting type application to initiate an action that mimics the effect of an artist rapping a loaded paint brush on her finger to produce spatters of paint on the paper. In this case, the user touches the display screen 145 with a finger and then strikes the pen 110 against that finger (or any other finger, object, or surface). Note that, given the limited hover-sensing range of typical computer device 105 (e.g., tablets, the tablet) typically will not know the actual (x, y) location of the tip electrode. Consequently, the touch and spatter gesture initiates an action that produces spatters (in a currently selected pen color) centered on the finger contact point. As with the previously noted gestures, the touch and spatter gesture is initiated with the pen 110 at any desired distance from the display screen, with pen 110 rapping motions being determined by one or more of the pen sensors and reported via the communications capabilities of the sensor pen 110. The touch and spatter gesture is discussed in further detail herein.

Other examples of correlated sensor pen motions relative to the computer device 105 include using sensor module 120 (e.g., accelerometers, pressure sensors, inertial sensors, grip sensors, etc.) to determine when the sensor pen 110 is picked up or put down by the user. By considering the current sensor pen 110 context or state (i.e., picked up or put down) relative to a current context or state of the computer device 105 (e.g., held by the user, power off, etc.), any desired action can be initiated (e.g., exit sleep mode in computer device when pen picked up, or enter sleep mode if pen set down).

Figure 3:
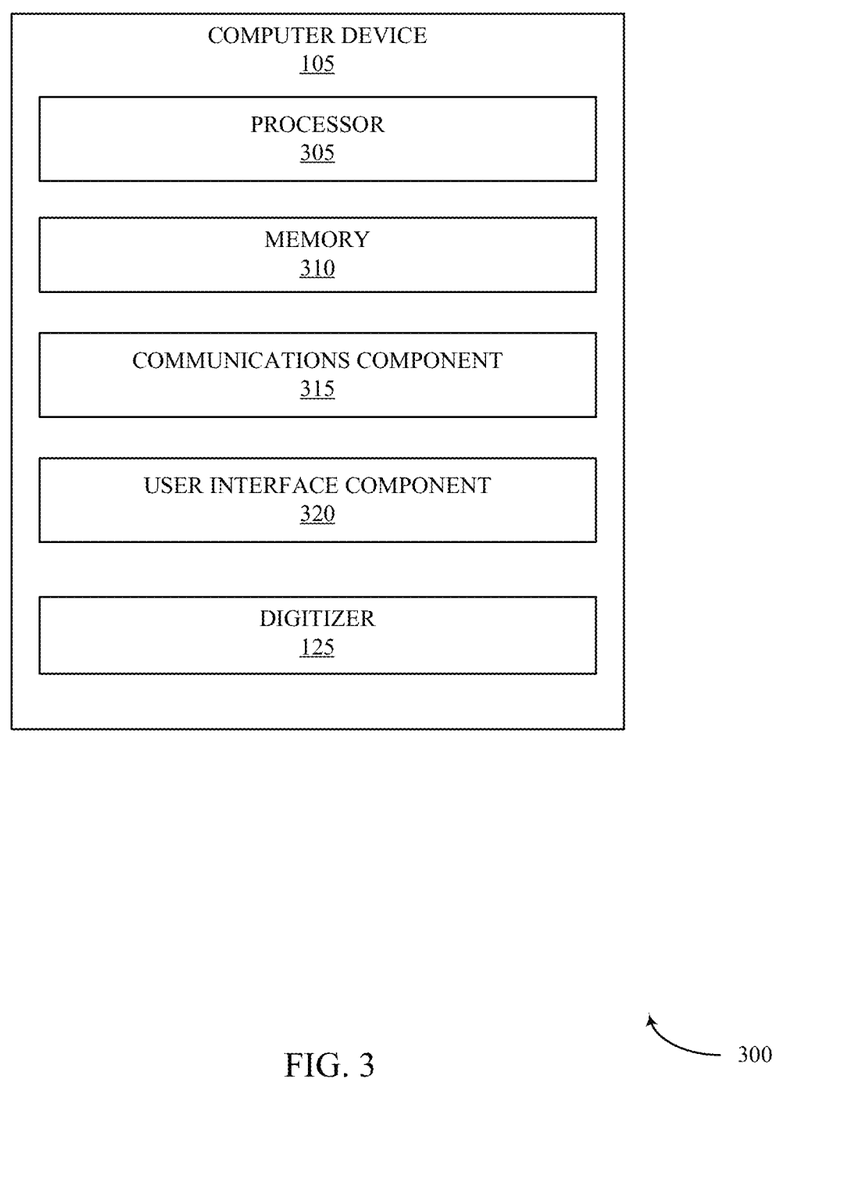
FIG. 3 is a diagram illustrating an example of a hardware implementation for the computer device in accordance with various aspects of the present disclosure.

Referring now to FIG. 3, a diagram illustrating an example of a hardware implementation for the computer device 105 in accordance with various aspects of the present disclosure is described. In some examples, the computer device 105 may be an example of the computer device 105 described with reference to FIG. 1. The computer device 105 may include a processor 305 for carrying out one or more processing functions (e.g., method 400) described herein.

The processor 305 may include a single or multiple set of processors or multi-core processors. Moreover, the processor 305 can be implemented as an integrated processing system and/or a distributed processing system.

The computer device 105 may further include a memory 310, such as for storing local versions of applications being executed by the processor 305. In some aspects, the memory 310 may be implemented as a single memory or partitioned memory. In some examples, the operations of the memory 310 may be managed by the processor 305. Memory 310 can include a type of memory usable by a computer, such as random access memory (RAM), read only memory (ROM), tapes, magnetic discs, optical discs, volatile memory, non-volatile memory, and any combination thereof. Additionally, the processor 305, and memory 310, may include and execute operating system (not shown).

Further, the computer device 105 may include a communications component 315 that provides for establishing and maintaining communications with one or more parties utilizing hardware, software, and services as described herein. Communications component 315 may carry communications between components and modules of the computer device 105. The communications component 315 may also facilitate communications with external devices to the computer device 105, such as to electronic devices coupled locally to the computer device 105 and/or located across a communications network and/or devices serially or locally connected to the computer device 105. For example, communications component 315 may include one or more buses operable for interfacing with external devices.

The computer device 105 may include a user interface component 320 operable to receive inputs from a user of the computer device 105 and further operable to generate outputs for presentation to the user. The user interface component 320 may include one or more input devices, including but not limited to a navigation key, a function key, a microphone, a voice recognition component, any other mechanism capable of receiving an input from a user, or any combination thereof. Further, user interface component 320 may include one or more output devices, including but not limited to a display 145, a speaker, any other mechanism capable of presenting an output to a user, or any combination thereof.

The computer device 105 may further include a digitizer 125 as discussed with reference to FIG. 1. The digitizer 125 may detect one or more signals transmitted from an input device, such as a stylus 110. In some examples the electronic components of the stylus 110 may generate wireless signals that are broadcasted or transmitted and received by the digitizer 125. The signals may provide data on pen location, pressure and other functionalities. Most pens may also include one or more function buttons (e.g. eraser and right-click) that can be used in the place of a mouse or keyboard. Information associated with the function buttons (e.g., whether the user has pressed the button) may also be received by the digitizer 125.

However, when the digitizer 125 detects that the received signal is missing pressure information associated with the pressure sensor of the stylus 110, the digitizer 125 may determine that the pressure sensor of the stylus 110 may be damaged or broken. Arriving at this conclusion may be based on the digitizer 125 detecting the peak voltage of the received signal for a predetermined time period. Specifically, if the digitizer 125 detects a signal exceeding a threshold voltage for a predetermined threshold time period (e.g., the pen 110 continues to transmit the signal without pressure information for a predetermined time period), the digitizer 125 may conclude that the stylus 110 is in contact with (or hovering) on the display screen with the intent to interact with the computer device 105. Based on this determination, the digitizer 125 may detect and display interaction with pressure-less pens.

In some instances, the digitizer 125 may calculate the probability that the pen is unable to report pressure based on the time that the pen 110 is detected in the "intent to contact screen" state (i.e., the signal from the pen 110 has exceeded a threshold voltage levels for a predetermined time period illustrating the likelihood that the pen 110 is in contact or hovering close to the screen 145). The greater elapsed time, the digitizer 125 may calculate with greater probability that the pen is in intent to contact screen state. Similarly, if the digitizer 125 detects that the pen was in the "intent to contact screen" state for a first time period without pressure information and subsequently moved out of threshold range (i.e., voltage levels of the signal) while remaining in detection range (i.e., the pen 110 is still in vicinity of the display screen 145 even if not hovering or in contact), and returned within the threshold range (i.e., contact or hovering) during the second time period, the digitizer 125 may conclude with higher probability that the pen 110 is a pressure-less pen 110 (i.e., damaged or broken pressure sensor).

In some examples, the digitizer 125 in collaboration with the memory 310 may store information associated with the stylus 110 (e.g., whether the pen is pressure-less) from the prior sessions such that the time to determine whether the pressure sensor is damaged or broken is minimized. In some examples, the computer device 105 may store the pen identification (ID) associated with the stylus 110 and corresponding status (e.g., pressure-less or pressure-capable) in the memory 310 or remote cloud service (not shown) such that for subsequent sessions, the digitizer 125 may identify the pen capabilities with minimum delay. Thus, as illustrated above, allowing the user to functionally use a damaged or broken stylus 110 (even with the tradeoff of accuracy) as provided by the present disclosure may provide cost efficiencies that would not otherwise be available with conventional systems.

Figure 4:
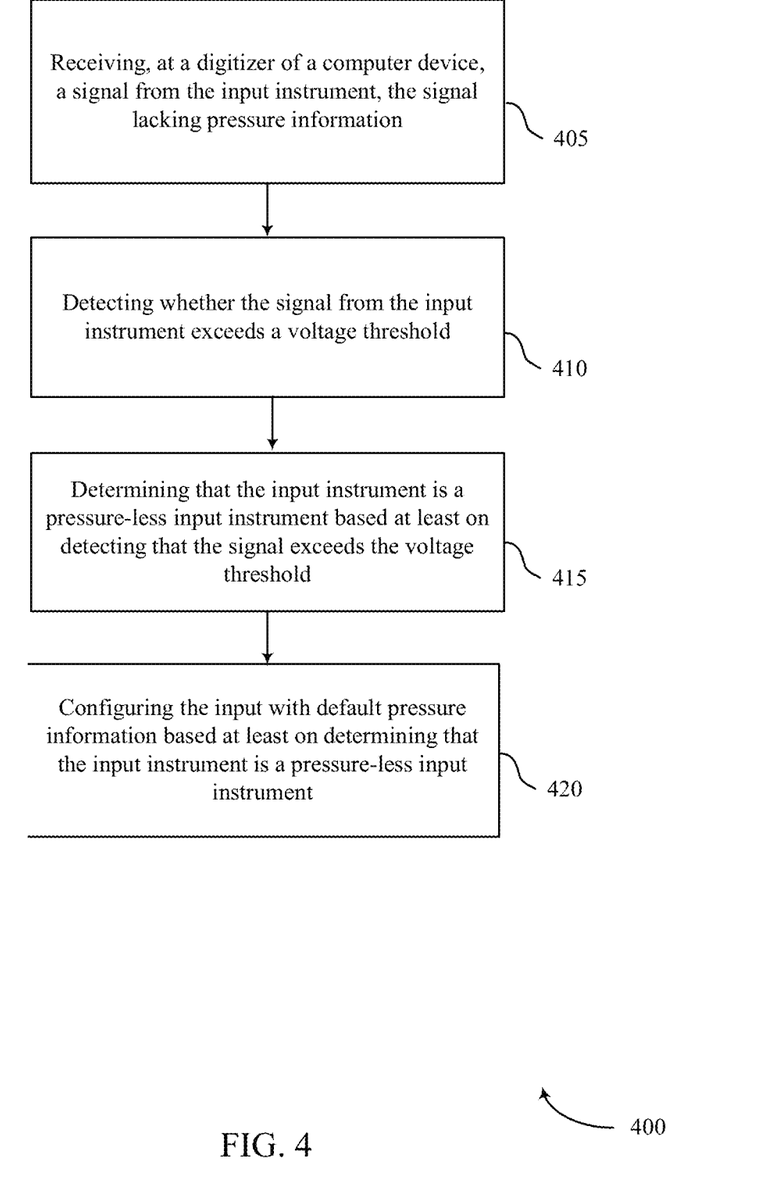
FIG. 4 is a flowchart of a method for detecting stylus input in absence of pressure information in accordance with aspects of the present disclosure.

Turning next to FIG. 4, method 400 for detecting input associated with an input instrument (e.g., stylus) is described. The method 400 may be performed by the computer device 105 as described with reference to FIGS. 1 and 3. Although the method 400 is described below with respect to the elements of the computer device 105, the method 400 may be performed by any computer or network system.

At block 405, the method 400 may include receiving, at a digitizer of the computer device, a signal from the input instrument. The signal may lack pressure information. In some examples, the digitizer may receive a signal with an indication that the input instrument is unable to transmit pressure information because either the tip electrode or the associated pressure sensor of the input instrument is broken or damaged. Aspects of block 405 may be performed by the communications component 315 and digitizer 125 as described with reference to FIG. 3.

At block 410, the method 400 may include detecting whether the signal from the input instrument exceeds a voltage threshold. Particularly, when the input instrument is near the surface of the display, the input instrument may transmit the signal. The signal may be detected by the digitizer based on peak voltage that would exceed the voltage threshold when the input instrument is brought closer to the display surface as opposed to when the input instrument is further away. Thus, when the input instrument is within a hovering threshold (e.g., 3-5 mm), the voltage of the signal may exceed the voltage threshold. The longer the input instrument remains in contact or hovering over the display surface, the greater confidence the digitizer may have in determining that the input instrument may attempting to interact (e.g., write or select) with the computer device using the input instrument. Aspects of block 410 may be performed by the digitizer 125 as described with reference to FIG. 3.

At block 415, the method 400 may include determining that the input instrument is a pressure-less input instrument based at least on detecting that the signal exceeds the voltage threshold. In some examples, the computer device may store information associated with the pressure-less input instrument in a memory of the computer device for subsequent session. In some aspects, the memory may be remotely located in a cloud service such that a second computer device may identify the stylus input instrument based on pen ID (i.e., whether the stylus is a pressure-less pen). The method may also include calculating a probability that the input instrument is pressure-less input instrument based on a length of time that the signal is detected as exceeding the voltage threshold. The greater the time period, the higher the probability that the input instrument is a pressure-less input instrument. In some examples, the failure to transmit (or lack of) the pressure information may be based on fact that the input instrument may include damaged or broken pressure sensor, tip electrode, tail electrode, or ring electrode. In some examples, the determination that the input instrument is a pressure-less stylus is determined without modifying existing pen protocols. In some aspects, the digitizer may also retrieve pressure capability information associated with the stylus from a remote storage (e.g., cloud service). The pressure capability information may indicate whether a pressure sensor of the stylus is damaged or broken so as to minimize the time required to detect that the stylus is a pressure-less pen. Aspects of block 415 may be performed by the digitizer 125 as described with reference to FIG. 3.

At block 420, the method 400 may include configuring the input with default pressure information (e.g., 50% pressure of range or last known pressure) based at least on determining that the input instrument is the pressure-less input instrument. In some examples, default pressure information may be predetermined or dynamically selected by the user (e.g., by updating the settings). Aspects of block 420 may be performed by the user interface component 320 as described with reference to FIG. 3.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a device, which can be a wired device or a wireless device. A wireless device may be a cellular telephone, a satellite phone, a cordless telephone, a Session Initiation Protocol (SIP) phone, a wireless local loop (WLL) station, a personal digital assistant (PDA), a handheld device having wireless connection capability, a computer device, or other processing devices connected to a wireless modem.

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It should be appreciated to those of ordinary skill that various aspects or features are presented in terms of systems that may include a number of devices, components, modules, and the like. It is to be understood and appreciated that the various systems may include additional devices, components, modules, etc. and/or may not include all of the devices, components, modules etc. discussed in connection with the figures.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave may be included in the definition of medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media. While aspects of the present disclosure have been described in connection with examples thereof, it will be understood by those skilled in the art that variations and modifications of the aspects described above may be made without departing from the scope hereof. Other aspects will be apparent to those skilled in the art from a consideration of the specification or from a practice in accordance with aspects disclosed herein.

What is claimed is:

1. A method for detecting input associated with an input instrument, comprising:
    receiving, at a digitizer of a computer device, a signal from the input instrument, wherein the input instrument is configured to provide pressure information that identifies a pressure value exerted on a display screen surface of the computer device from a range of pressure values, and wherein the signal received at the digitizer lacking the pressure information;
    detecting whether the signal from the input instrument exceeds a voltage threshold;
    determining that the input instrument is a pressure-less input instrument based at least on detecting that the signal exceeds the voltage threshold; and
    configuring the input with default pressure information based at least on determining that the input instrument is the pressure-less input instrument.

2. The method of claim 1, further comprising:
    storing information associated with the pressure-less input instrument from a first time period in a memory of the computer device for use during a second time period.

3. The method of claim 2, further comprising:
    calculating a probability that the input instrument is the pressure-less input instrument based on a length of time that the signal is detected exceeding the voltage threshold.

4. The method of claim 1, wherein the pressure-less input instrument includes damaged or broken pressure sensor.

5. The method of claim 1, wherein determination that the input instrument is the pressure-less input instrument is determined without modifying a digitizer communication pen protocol.

6. The method of claim 1, wherein the signal includes an indication that the input instrument is unable to transmit the pressure information.

7. The method of claim 1, further comprising:
    retrieving pressure capability information associated with the input instrument from a remote storage, wherein the pressure capability information indicates whether a pressure sensor of the input instrument is damaged or broken.

8. A computer device for detecting input associated with an input instrument, comprises:
    a memory to store data and instructions; and
    a processor in communication with the memory, wherein the processor is configured to execute instructions to:
        receive, at a digitizer of a computer device, a signal from the input instrument, wherein the input instrument is configured to provide pressure information that identifies a pressure value exerted on a display screen surface of the computer device from a range of pressure values, and wherein the signal received at the digitizer lacking the pressure information;
        detect whether the signal from the input instrument exceeds a voltage threshold;
        determine that the input instrument is a pressure-less input instrument based at least on detecting that the signal exceeds the voltage threshold; and
        configure the input with default pressure information based at least on determining that the input instrument is the pressure-less input instrument.

9. The computer device of claim 8, wherein the processor is further configured to execute instructions to:
    store information associated with the pressure-less input instrument from a first time period in a memory of the computer device for use during a second time period.

10. The computer device of claim 8, wherein the processor is further configured to execute instructions to:
    calculate a probability that the input instrument is the pressure-less input instrument based on a length of the time that the signal is detected exceeding the voltage threshold.

11. The computer device of claim 8, wherein the pressure-less input instrument includes damaged or broken pressure sensor.

12. The computer device of claim 8, wherein determination that the input instrument is the pressure-less input instrument is determined without modifying a digitizer communication pen protocol.

13. The computer device of claim 8, wherein the signal includes an indication that the stylus is unable to transmit pressure information.

14. The computer device of claim 8, wherein the processor is further configured to execute instructions to:
    retrieve pressure capability information associated with the input instrument from a remote storage, wherein the pressure capability information indicates whether a pressure sensor of the input instrument is damaged or broken.

15. A non-transitory computer-readable medium storing instructions executable by a computer device for detecting input associated with an input instrument comprising instructions executable by the computer device for:
    receiving, at a digitizer of a computer device, a signal from the input instrument, wherein the input instrument is configured to provide pressure information that identifies a pressure value exerted on a display screen surface of the computer device from a range of pressure values, and wherein the signal received at the digitizer lacking the pressure information;
    detecting whether the signal from the input instrument exceeds a voltage threshold;
    determining that the input instrument is a pressure-less input instrument based at least on detecting that the signal exceeds the voltage threshold; and
    configuring the input with default pressure information based at least on determining that the input instrument is the pressure-less input instrument.

16. The non-transitory computer-readable medium of claim 15, further comprising instructions for:
    storing information associated with the pressure-less input instrument from a first time period in a memory of the computer device for use during a second time period.

17. The non-transitory computer-readable medium of claim 15, further comprising instructions for:
    calculating a probability that the input instrument is the pressure-less input instrument based on a length of time that the signal is detected exceeding the voltage threshold.

18. The non-transitory computer-readable medium of claim 15, wherein the pressure-less input instrument includes damaged or broken pressure sensor.

19. The non-transitory computer-readable medium of claim 15, wherein determination that the input instrument is the pressure-less input instrument is determined without modifying a digitizer communication pen protocol.

20. The non-transitory computer-readable medium of claim 15, wherein the signal includes an indication that the input instrument is unable to transmit pressure information.

\* \* \* \* \*